(12) United States Patent
Overton

(10) Patent No.: US 7,577,666 B2
(45) Date of Patent: Aug. 18, 2009

(54) INTERNET BASED MOBILE DEVICE TRACKING AND INTERACTIVE COMMUNICATION SYSTEM AND METHOD

(76) Inventor: Andrew E. Overton, 4132 Deeboyar AV Apt. #18, Lakewood, CA (US) 90712

(*) Notice: Subject to any disclaimer, the term of this patent is extended or adjusted under 35 U.S.C. 154(b) by 309 days.

(21) Appl. No.: 11/805,945

(22) Filed: May 24, 2007

(65) Prior Publication Data
US 2008/0177749 A1   Jul. 24, 2008

Related U.S. Application Data

(60) Provisional application No. 60/885,432, filed on Jan. 18, 2007.

(51) Int. Cl.
*G06F 7/00* (2006.01)
(52) U.S. Cl. .................................. 707/10; 455/418
(58) Field of Classification Search ............ 707/3, 707/6, 9, 10; 705/14; 455/418, 456.1; 340/576
See application file for complete search history.

(56) References Cited

U.S. PATENT DOCUMENTS

| | | | |
|---|---|---|---|
| 6,980,993 B2* | 12/2005 | Horvitz et al. | 707/10 |
| 2005/0181803 A1* | 8/2005 | Weaver et al. | 455/456.1 |
| 2006/0038690 A1* | 2/2006 | Shmerling et al. | 340/576 |
| 2008/0076400 A1* | 3/2008 | Moosavi et al. | 455/418 |
| 2008/0133716 A1* | 6/2008 | Rao et al. | 709/220 |
| 2008/0172292 A1* | 7/2008 | Hurowitz et al. | 705/14 |

* cited by examiner

*Primary Examiner*—Wilson Lee
(74) *Attorney, Agent, or Firm*—Donald W. Meeker (57) ABSTRACT

Computer software, including internet web page based code, and methods of applications are used with a mobile device tracking system. A locatable mobile communications device is tracked by a contact initiating website in conjunction with a user's desired contact profile. A user signs up or joins as a registered member and inputs the user's mobile communications device tracking information, such as Global Positioning System (GPS) receiver information. The main service website cross checks the user's input parameters against the parameters input by all other main service website members to identify a satisfactory match and notify the matched members to initiate a personal contact or meeting.

6 Claims, 5 Drawing Sheets

Continuation of notification process from FIGS. 2A and 2B. Continuation is applicable for both FIGS. 2 and 3.

23

Member 2 decides to continue the notification process.

24

Member 1 will then receive a notification of a request for a meeting and the reasons why. The notification will state: A member has requested a meeting because of their desire to contact graduates from Syracuse High School between the years of 1975-85. Would you like to accept this request?

25

Acceptance by Member 1 will start the meeting process. Each member has previously listed their preferences for a meeting place. The business model then determines the top 3 places for both Member 1 and 2 to be Starbucks, McDonalds, and Chiliis.

26

The Members will rate the meeting place choices and the system will determine the best place. The system now knows the location of both members and a centrally located preferred establishment for a meeting. It will now provide the location for the meeting, directions, and expected time of arrival for both members.

27

Membersí name and phone number can be provided at anytime in the notification process. Prompts can be voice, text, or email, depending on the Membersí preferences.

*FIG. 4*

Member 1 has two possibilities for establishing notification parameters. Personal attributes are used for allowing other members to select Member 1 for a potential meeting if the second member contingencies for receiving notifications and distance requirements are satisfied. Member 1 can also load contingencies for receiving notifications for meeting other members.

| Personal Attributes | Contingencies for Receiving Notifications |
|---|---|
| Graduated from Syracuse High school in 1980. | Members who graduated from Syracuse High School between the years of 1975 and 1985 and are within 5 miles. |
| Initiated into Kappa Sigma at Kansas in 1982. | Members who were initiated into Kappa Sigma at Kansas between the years of 1980 and 1990 and are within 20 miles. |
| Member of Industry Hills Men's Golf Club, 1998 ñ 107. | Members of Industry Hills Men's Golf Club between 1998 and 2007 and are within 1 mile |

Making new Acquaintances

| Personal Attributes | Contingencies for Receiving Notifications |
|---|---|
| Interest in golf ñ 6. | Interest in golf from 5-8. Looking for someone who has similar interests in golf. |
| Physical attractiveness ñ 6. | Physical attractiveness between 5 and 8. |
| Physical fitness ñ 2. | Physical fitness between 6 and 8. Looking for someone who is more interested in physical fitness. |
| Interest in sports ñ 7. | Interest in sports from 2-7. Member 1 is not concerned about other members interest in sports. |
| Notification dependent on other member's parameters. | Notification dependent on satisfying 3 of 4 characteristics (or 75%) for meeting new people and are within 6 miles. |

*FIG. 5*

INTERNET BASED MOBILE DEVICE TRACKING AND INTERACTIVE COMMUNICATION SYSTEM AND METHOD

CROSS-REFERENCE TO RELATED APPLICATIONS

The present utility patent application claims the benefit of provisional application No. 60/885,432, filed Jan. 18, 2007.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates generally to the field of applications for tracking electronic communications device users for contact purposes and it pertains specifically to such service applications using a mobile device tracking system, a locatable mobile communications device, and a contact initiating website in conjunction with a user's desired contact profile for the purpose of making connections between individuals having mutual interest.

2. Description of Related Art Including Information Disclosed Under 37 CFR 1.97 and 1.98

It is desirable for people to interact with people of similar interests or backgrounds, especially to locate such individuals who are in geographical proximity at the same time. There have been many attempts to create interactive communication and people matching or people locating systems, but none of them provide a really comprehensive system for enabling location of and interaction with people of similar interests or backgrounds who are in geographical proximity at a specific time.

U.S. Pat. No. 6,756,918 for a method and apparatus for locating mobile units tracking another or within a prescribed geographic boundary.

U.S. Pat. No. 6,414,635 for a geographic-based communication service system with more precise determination of a user's known geographic location.

U.S. Pat. No. 6,317,604 for a centralized database system for a wireless location system.

U.S. Pat. No. 6,842,433 for a system and method for communicating information from a computerized distributor to portable computing devices.

U.S. Pat. No. 6,618,005 provides a system for determining wireless device locations.

What is needed is a system for enabling an individual to locate and interact with other individuals of similar interests or backgrounds based on their geographical proximity with each other.

BRIEF SUMMARY OF THE INVENTION

Several advantages and objects of the present invention include:

A principal object of the present invention is to provide an Internet Based Mobile Device Tracking System & Method of use thereof which will overcome deficiencies of prior art devices.

Another object of the present invention is to provide an Internet Based Mobile Device Tracking System & Method of use thereof which offers a new and novel way for a web surfer to interact with web based content.

A further object of the present invention is to provide an Internet Based Mobile Device Tracking System & Method of use thereof which allows users to connect with other users when they are within a defined proximity or area.

One more object of the present invention is to provide an Internet Based Mobile Device Tracking System & Method of use thereof which offers users a new way to stay connected to individuals from their past.

Still another object of the present invention is to provide an Internet Based Mobile Device Tracking System & Method of use thereof which allows a user to enter specific parameters to define the types of individuals they want to be matched and connected with.

Another further object of the present invention is to provide an Internet Based Mobile Device Tracking System & Method of use thereof which allows traveling user/members to connect with other user/members which are located in the area of travel.

An additional object of the present invention is to provide an Internet Based Mobile Device Tracking System & Method of use thereof which will inform user/members who match a specific set of profile parameters, by means of a main service website, notifications to the user/member's mobile communication device.

Yet one more object of the present invention is to provide an Internet Based Mobile Device Tracking System & Method of use thereof which utilizes Global Position System technology to track, position, and notify user/members of the proximity to other user/members.

Yet another object of the present invention is to provide an Internet Based Mobile Device Tracking System & Method of use thereof which utilizes adjustable input parameters to match and connect user/members to other user/members.

One further object of the present invention is to provide an Internet Based Mobile Device Tracking System & Method of use thereof which is more universally functional in today's market than prior art devices.

It is intended that any other advantages and objects of the present invention which become apparent or obvious from the detailed description or illustrations contained herein are within the scope of the present invention.

In brief, the present invention provides a new and useful Internet Based Mobile Device Tracking System & Method of use thereof, which is simpler in use, more universally functional, and more versatile in operation than known applications of this kind. The purpose of the present invention is to provide a new internet based service using a mobile device tracking system, a locatable mobile communications device, and a contact initiating website in conjunction with a user's desired contact profile for the purpose of making connections between individuals having mutual interest. It is also a purpose of the present invention to provide a new Internet Based Mobile Device Tracking System & Method of use thereof which has many novel features not offered by prior art applications resulting in a new Internet Based Mobile Device Tracking System & Method of use thereof which is not apparent, obvious, or suggested, either directly or indirectly by any prior art applications.

The present invention generally comprises computer software, including internet web page based code, and methods of applications for providing the user with an internet based website service which allows a user to go to the main service website, sign up or join as a registered member, input their mobile communications device tracking information, (such as Global Positioning System or GPS receiver information, for example, a GPS enabled cell phone), and then input a series of parameters into a personalized web-based application. The main service website will then cross check the user's input parameters against the parameters input by all other main service website members. Once a satisfactory match has been identified by the main service website between the user's input parameters (including distance requirements), and either one or a multitude of other main service website members, the main service website will then initiate a communication, by means of text message, phone call, email, or other similar communication, to each user/member, which will serve as a notification to the user informing them of a match. The user/member(s) can then choose to act on the communication information provided by the main service website by contacting the other user/members to initiate a personal contact or meeting.

BRIEF DESCRIPTION OF THE SEVERAL VIEWS OF THE DRAWINGS

These and other details of the present invention will be described in connection with the accompanying drawings, which are furnished only by way of illustration and not in limitation of the invention, and in which drawings:

FIG. 5 is a diagrammatic view showing the personal attributes and interests of a member and the contingencies for the member to receive a notification based on related attributes and interests within a range of acceptability and also based on real time physical proximity.

DETAILED DESCRIPTION OF THE INVENTION

In FIGS. 1-5, an internet or world wide web based mobile device tracking and interactive communication system 100 comprises at least one locatable mobile communications device 30 for each user 10A and 10B; at least one mobile device tracking system 50 for automatically tracking at least one locatable mobile communications device 30 in real time; computer software programs 20 comprising internet web page based code comprising automated applications related to at least one mobile device tracking system.

Figure 1:
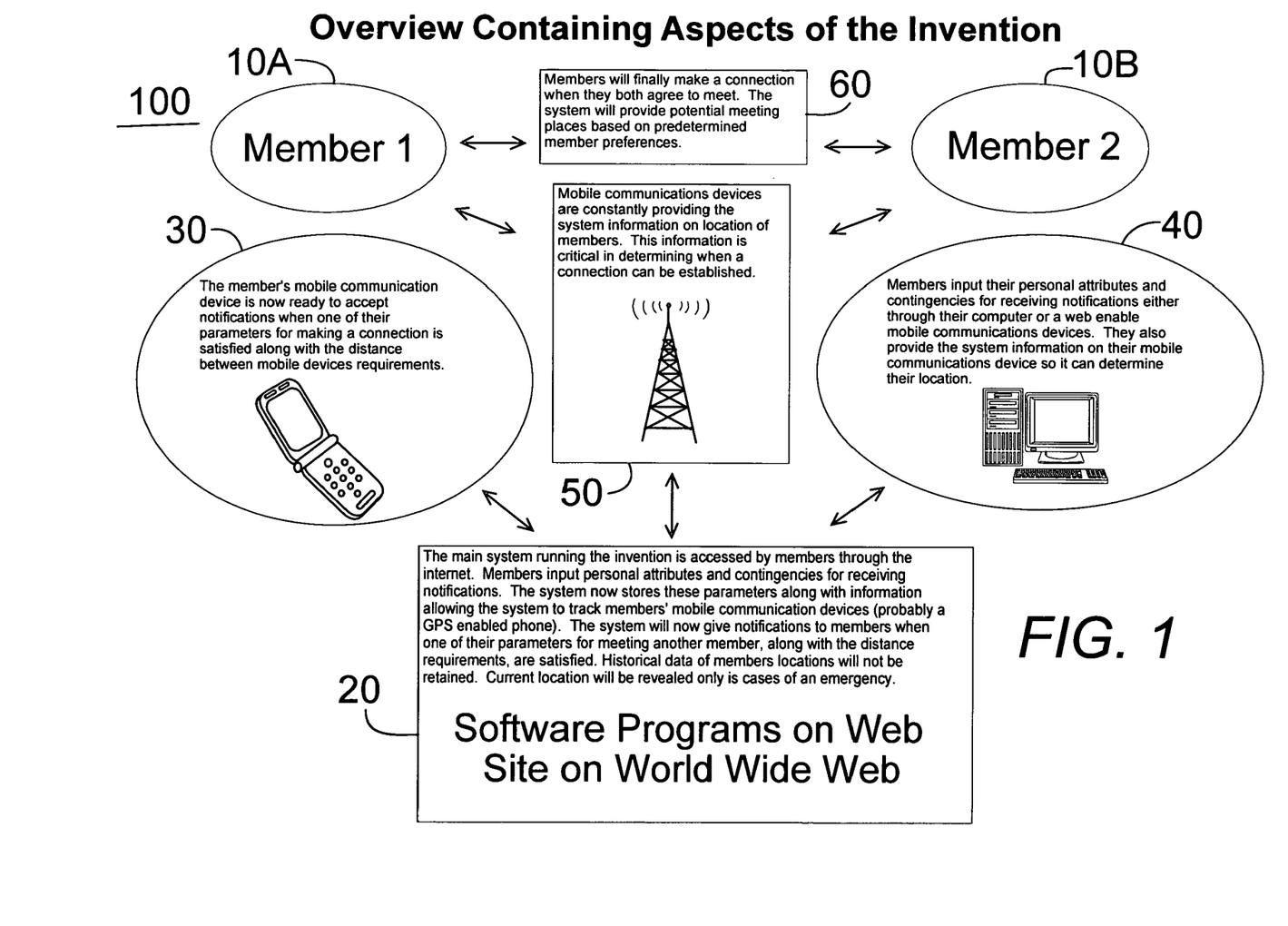
FIG. 1 is a diagrammatic view showing an overview of the various components of the system of the present invention.
Figure 2A:
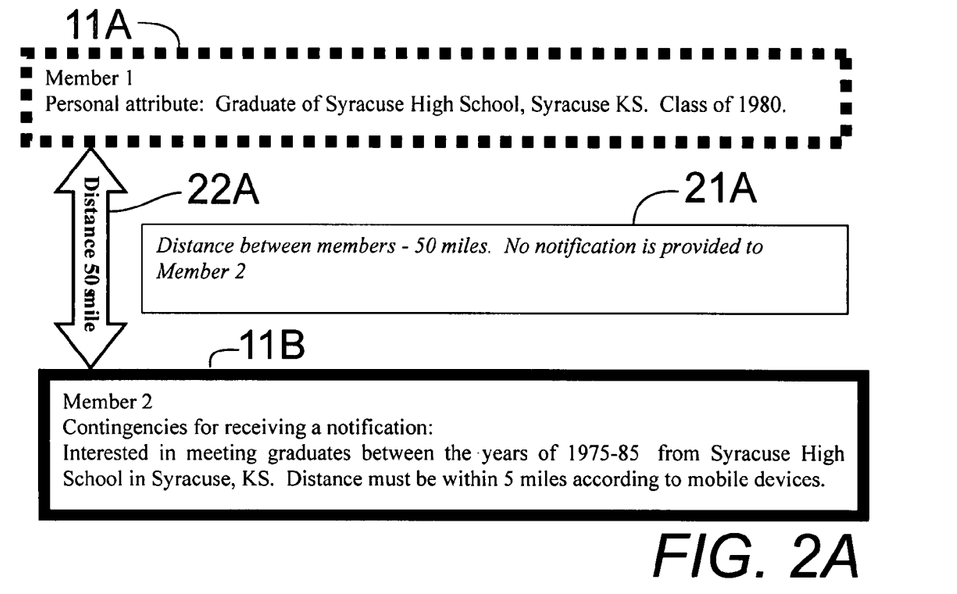
FIG. 2A is a diagrammatic view showing attributes of a first member and contingencies of a second member for receiving a notification wherein the real time distance between the members is greater than the acceptable distance so that no notification is made.
Figure 2B:
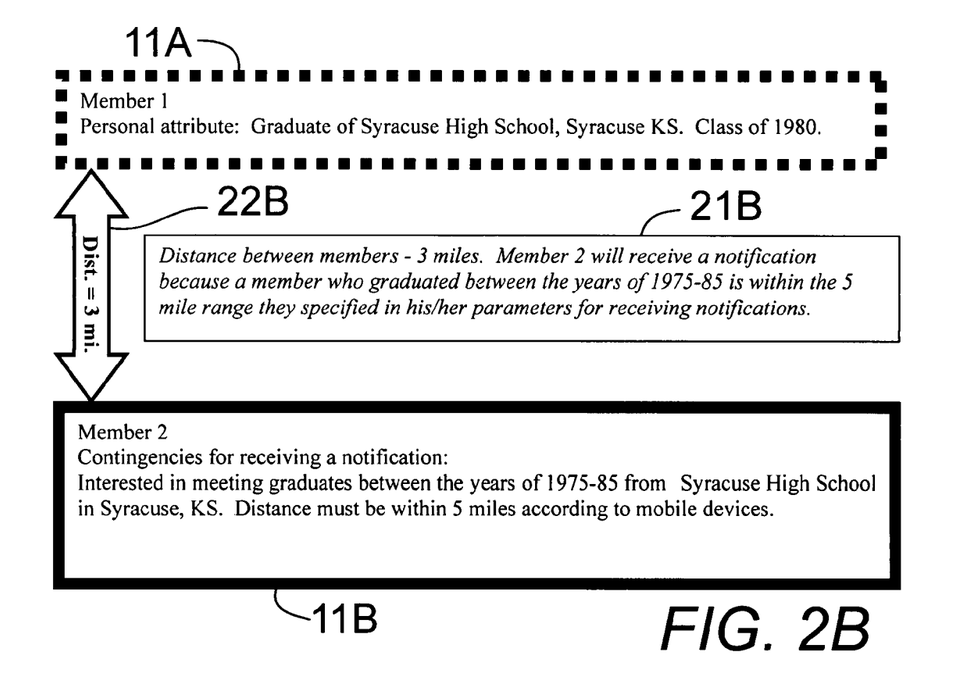
FIG. 2B is a diagrammatic view showing attributes of a first member and contingencies of a second member for receiving a notification of FIG. 2A wherein the real time distance between the members is within the range of acceptable distance so that a notification is made.
Figure 3A:
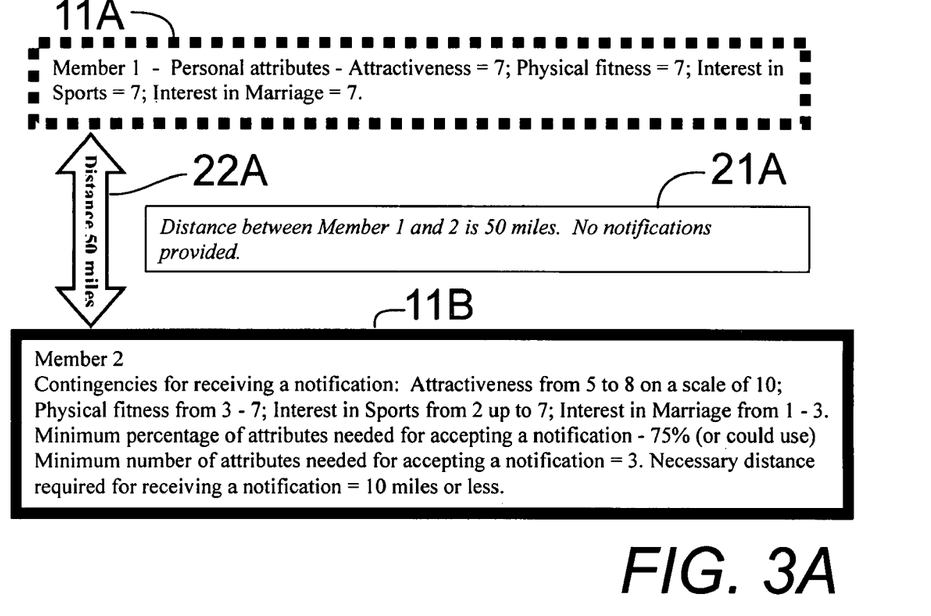
FIG. 3A is a diagrammatic view showing attributes of a first member with numerical values and contingencies of a second member for receiving a notification with ranges of numerical values wherein the real time distance between the members is greater than the acceptable distance so that no notification is made.
Figure 3B:
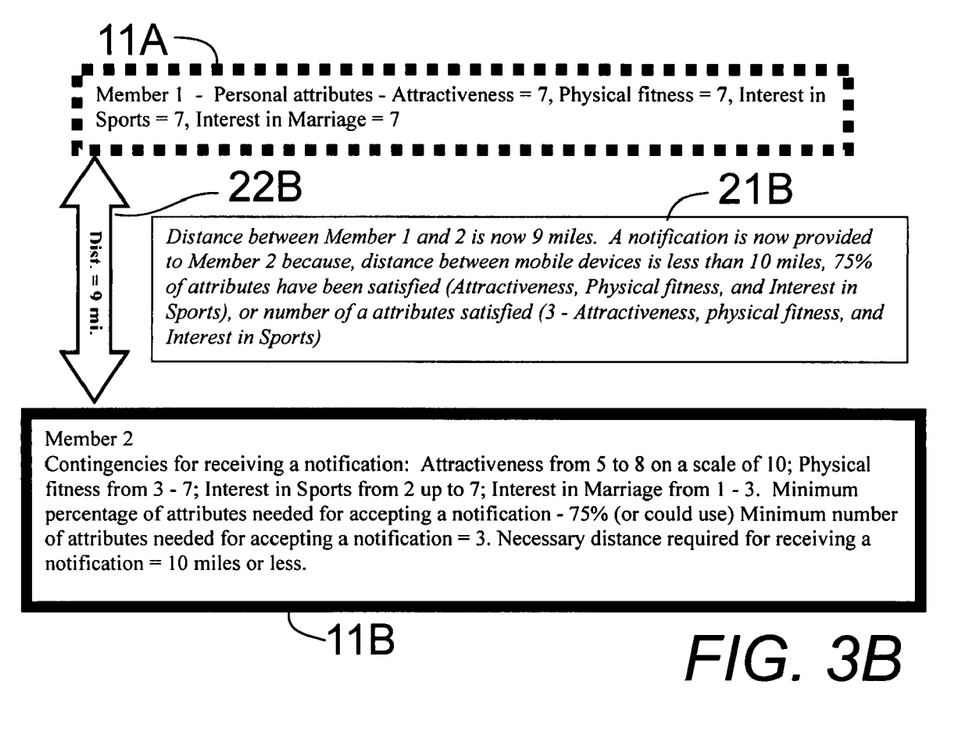
FIG. 3B is a diagrammatic view showing attributes of a first member and contingencies of a second member for receiving a notification of FIG. 3A wherein the real time distance between the members is within the range of the acceptable distance so that a notification is made.
Figure 4:
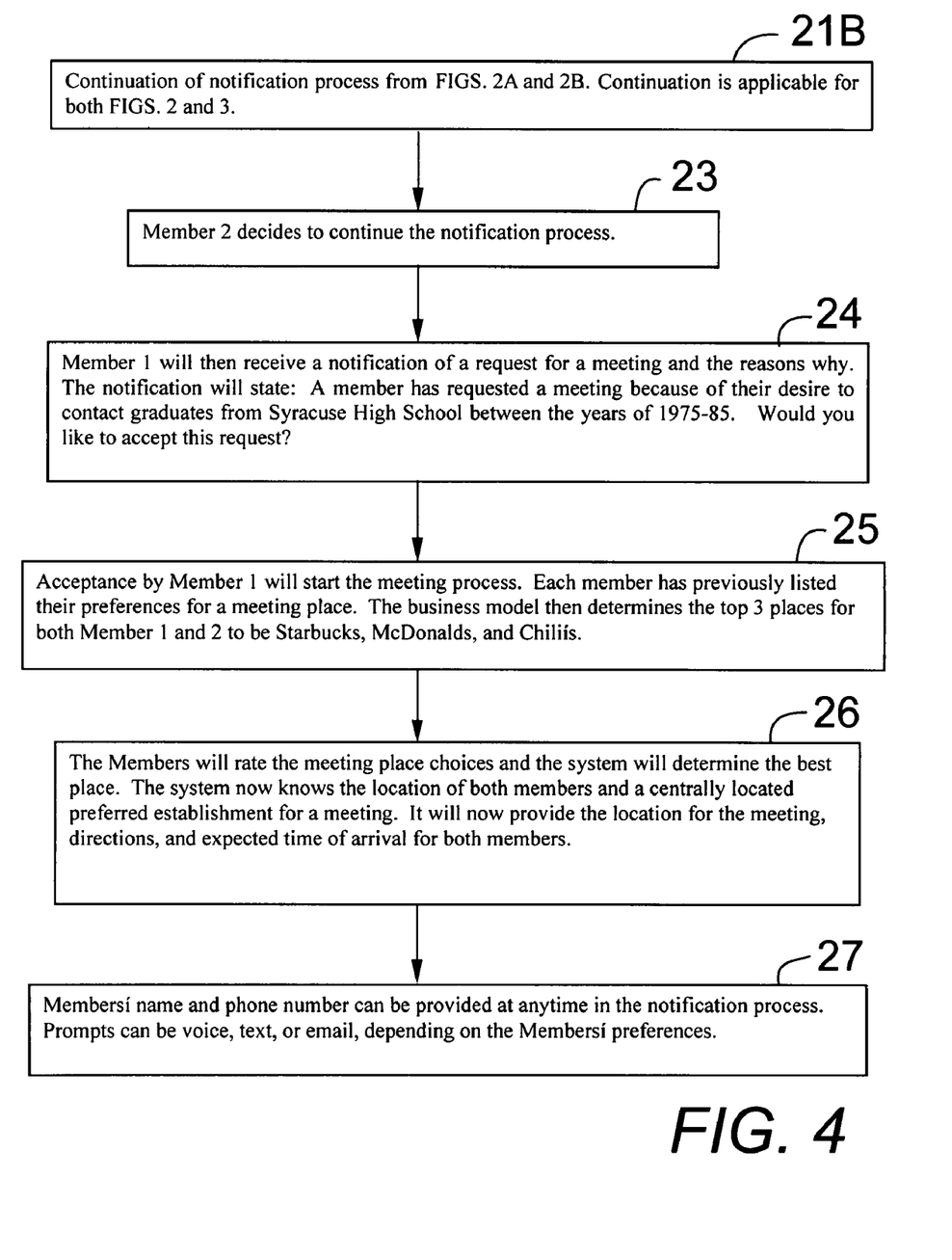
FIG. 4 is a diagrammatic view showing a flow chart of the interaction process of two members using the system of the present invention.

An automated contact initiating website has programmed means, the computer software programs 20, for inputting a user's desired contact profile 11A and 11B from a user's computer or web enabled mobile communications device 40, and for providing the user with an internet based website service which allows a user to go to a main service website, sign up, and join as a registered member, and input the user's mobile communications device tracking information. Using an automated personalized web-based application, the user as a registered member inputs the user's desired contact profile 11A and 11B including a series of parameters related to desired interaction with other users into the personalized web-based application. The system further comprises programmed means for automatically cross checking the user's input parameters against the parameters input by all other internet based website service members and for automatically checking the geographical location of the members using at least one mobile device tracking system 50 to identify a satisfactory match between the member's input parameters and real time geographical location, and either one or a multitude of other internet based website members' input parameters and real time geographical proximity.

Means for automatically communicating messages to initiate a communication to notify each member identified as having a satisfactory match related to at least one other member's input parameters and real time geographical proximity serves as a notification to inform them of the satisfactory match so that each notified member can choose to act on the communicated messages by contacting at least one other matching identified member to initiate a personal contact or meeting 60. The means for communicating messages may comprise at least one communicating system taken from the list of communicating systems including a text message, a phone call, or an email.

At least one mobile device tracking system 50 preferably comprises a Global Positioning System (GPS) and the user inputs the user's Global Positioning System receiver information.

An internet based mobile device tracking and interactive communication method comprises:

Providing a user with at least one mobile communication device 30 with global positioning capability and a mobile device tracking system 50 for tracking locatable mobile communications devices 30 in real time.

Providing automated computer software 20 comprising internet web page based code comprising applications related to at least one mobile device tracking system 50.

Providing an automatic contact initiating website with programmed means for inputting a user's desired contact profile 11A and 11B and for providing the user with an internet based website service which allows a user to go to a main service website, sign up and join as a registered member, and input a user's mobile communications device tracking information.

Providing an automated personalized web-based application for the user as a registered member to input the user's desired contact profile including a series of parameters 11A and 11B related to desired interaction with other members into the personalized web-based application.

Automatically cross check, by a programmed means for cross checking, the user's input parameters against the parameters input by all other internet based website service members and tracking the geographical location of the members using at least one mobile device tracking system to identify a satisfactory match between the member's input parameters and real time geographic location, and either one or a multitude of other internet based website members' input parameters and real time geographical proximity.

Automatically initiate a communication, by a means for communicating messages, to notify each member identified as having a satisfactory match related to at least one other member's input parameters and real time geographical proximity to serve as a notification to inform them of the satisfactory match so that each notified member can choose to act on the communicated messages by contacting at least one other matching identified member to initiate a personal contact or meeting.

The Global Positioning System (GPS) is preferred as the mobile device tracking system and the user inputs the user's Global Positioning System receiver information.

Initiating a communication comprises using at least one communicating system taken from the list of communicating systems including a text message, a phone call, or an email.

In use, the present invention, which generally comprises computer software, including internet web page based code, and methods of applications, a mobile device tracking system, a locatable mobile communications device, and a contact initiating website in conjunction with a user's desired contact profile for providing the user with an internet based website service, allows a user to go to the main service website, sign up or join as a registered member, input their mobile communications device tracking information, (such as Global Positioning System or GPS receiver information), and then input a series of parameters into a personalized web-based application, whereby the main service website will then cross check the user's input parameters against the parameters input by all other main service website members. Once a satisfactory match has been identified by the main service website between the users input parameters, and either one or a multitude of other main service website members, the main service website will then initiate a communication, by means of text message, phone call, email, or other similar communication, to each user/member, which will serve as a notification to the user to inform them of the match. The user/member(s) can then choose to act on the communication information provided by the main service website by contacting the other user/members to initiate a personal contact or meeting.

It is to be further understood the input parameters referred to herein, as they pertain to the present invention, may include a variety of specific values which are relevant to the type of individual(s) a user/member is trying to connect with, such as physical descriptions including height, weight, hair color, etc., employment information, past or present living location information, school affiliation, date of graduation, ethnicity, religious affiliation, sports team affiliation, location the user grew up in, handicap information, family or surname information, or club and group affiliations. Each parameter will be further defined by distance between members' mobile devices and time period, either current or future depending on the member's personal situation. Some parameters may be defined even further on a scale of 1 to 10, indicating level of interest within the parameter being utilized. The parameters can also be set up to obtain a predetermined number or percentage of acceptable matching qualities before receiving a notification.

The user may set up lists of groups or individuals in conjunction with the parameter input profile they would be interested in meeting. They will also enter desired distance parameters between the user/member and the potential match users' mobile device. The individual could input their high school and graduation classes they would want to meet as an input value. For example, the user would be interested in knowing if anyone who graduated from Syracuse High School in Syracuse, Kans. between the years of 1975 and 1985 is within 5 miles of their mobile device. If someone fits these criteria, a notification is sent to the member to begin the meeting process. The user can then decide if they would be interested in talking to and meeting this person.

The input parameters, such as the graduating class year, or the distance between the user/members mobile devices can be adjusted to meet specific applications. For example, a user who is a few hundred miles from a location parameter may want to narrow the distance between mobile devices to a few hundred yards, while a user/member on the other side of the world might want to increase the distance to 40 miles, and increase the range of graduating class years from 1965 to present.

If an individual has a couple of hours of down time in the airport, the distance parameters between mobile devices could be reduced to a few hundred yards. If the individual knows they will have a couple of hour of down time in the airport between 2 and 4 pm, they can preset the desired parameter conditions for the expected period of down time prior to leaving their residence.

Another example where this technology is relevant is based on another group. Two individuals were members of the same fraternity at the University of Kansas. They both happened to be living in the same apartment complex in Hong Kong and had no idea the other individual was living in the same building. These individual could have had as there parameters University of Kansas Kappa Sigma members who graduated from college between 1980 and 1990 and are within 20 miles. Each person would have received a notification of their locations and re-established their relationship in a far away place.

The user is now going to a Los Angeles Lakers game and would consider meeting someone at halftime for a cocktail. This person could set up their parameters for the expected period of time the game will be played, and change the distance parameter for receiving notifications to the approximate size of the arena. Notifications would be received and the meeting process would be started if anyone from their hometown, who is also a member, is in the arena. The member could see if anyone from their fraternity is at the game. The user can check to see if someone from their golf club is in attendance. The company the individual works for can also be loaded and maybe discussing work issues at halftime would be a good idea. At anytime, it could be possible to change distances, relevant time periods, and groups of interest.

A second significant characteristic of the present invention is the possibility of meeting new people with this technology. The user can load qualities which are important to them. A scale or value could be attached to each of these qualities. When a user/member meets or matches the parameters input by a user/member, and the distance criteria between mobile devices is satisfied, the main service website will initiate a communication notification. If the individual likes golf and would be interested in meeting someone who feels the same way, this list or parameter input would be identified on their website profile. A scale or value from 1-10 could be utilized. The user might want to meet people who have an interest between 5 and 8 for golf. An individual who is obsessed with golf would have this as a 10 and would not be a match. An individual who lists their interest in golf at 6 is a match and would initiate a notification when the distance between mobile devices parameter is satisfied.

The user would list qualities which are important to them in a person they would like to meet. Physical attractiveness could be between 5 and 8. Staying physically fit would be between 3 and 7. Interest in sports could be between 2 and 7. Interest in getting married might be rated at 1 to 3. The user/member would then provide either what percentage of qualities needs to be satisfied in order to receive a notification or number of qualities someone needs for beginning the notification process. For example, if 75% or 3 of their required qualities are needed to start the notification process, and are met, and the mobile devices are within the specified acceptable range, a notification would be sent to the user. The notification would then include the qualities which the potential acquaintance possesses. The user could review the qualities and then decide if they want to notify the person. This part of the present invention for meeting new people contains the same capabilities of changing rating parameters, distance requirements, and percentage or number of parameters satisfied at a future point in time, either on a temporary basis or permanently.

Potential acquaintances who could satisfy the distance requirements for starting the notification process could include users/members who live nearby, or members who work close to each other's place of employment, or members who pass each other commuting to and from work. Driving to and from work each day could provide the opportunity to meet someone who drives a similar route or someone the user may pass each day.

Each user/member would approve notifications before a connection is made. The user/member first receives notification someone has matched their criteria. They then can make a decision to disregard the prompt, or act further. If they decide to proceed further, they use the mobile device to indicate they are interested in making a connection. A prompt is then sent to the user/member's potential acquaintance. This person can then decide to complete the meeting by agreeing to talk to the original user. The recipient of the final notification will also get information on why they received the prompt. The users could determine at anytime in the notification and meeting process to provide their name. For example, if someone satisfies their high school list, go ahead and provide the users name with the prompt. Additionally, merchants who could be considered as potential meeting places for user/members could be sponsors of the business model.

For this example, let's consider Starbucks to be a potential sponsor and a company who would pay a fee for this opportunity. Each user would have in their profile a list of potential places for making a connection with another user. The user could list Starbucks, McDonalds, and Chili's as potential meeting places. Consider now a user with a potential acquaintance who has moved into range of parameters for making a connection. For example, a high school classmate is now within 5 miles of the user. Both agree to make a connection. The business model knows their location and preferences of where they would like to meet. The model can now suggest a meeting place, provide directions, and expected arrival time to the location. The location would be central to both users. This feature would be most helpful if one or both of the users are in an unfamiliar location. This model is now directing consumers to a place of business which has value to the company where the users are meeting.

Additionally, more potential features include: The website may have the ability for users to upload information about their connections because of the business model. The website may include testimonials of connections which would be considered interesting to the user community. Notifications could be by voice, text messages, or emails from the system. The system could also provide distance between the member and a potential acquaintance under parameters established by the member. This information could be useful in adjusting the distance component for each parameter. The main service website will also allow a user/member to hear the parameters and respond by voice instructions while in transmit. The main service website also allows the user/member to update parameters for receiving a notification at a future date or time. Depending on how robust the web capabilities are with the mobile device, the user may want to set parameter for notification for a future time by using their home computer. These updates may be for a finite period of time, or could be the new conditions for notification permanently, going forward from a pre-determined point in time.

For example, the user knows where he/she is going for the evening will attract clientele which is different than their "baseline" set of parameters for meeting a potential acquaintance. Prior to going out, the user changes the parameters for receiving a notification of a match for only the period of time they expect to be in the club, for example, from 9:00 pm until 1:00 am. This would also be a good time to narrow down the distance between mobile devices to an area compatible to the size of the club. The parameters for notification would revert back to their "baseline" set of qualities after 1:00 am. As stated earlier, this feature could be more relevant for users who find making updates to their notification qualifications through a computer to their webpage easier than using a web-enabled mobile device. The member has the ability to load two sets of notification parameters, personal attributes and contingencies for receiving notifications. Personal attributes are groups the user has an association with or was a prior, or is a current member. They include graduated from Syracuse High School in 1980, graduated from the University of Kansas in 1985, initiated into the Kappa Sigma fraternity at the University of Kansas in 1982.

Personal attributes are also characteristic of the member, describing themselves, with the intent of meeting someone new. The individual may list their interest in golf at an 8, their physical features at 6, interest in animals as 2, and their interest in having children at 3 on a scale of 1 to 10. Personal attributes would now allow other members to make a connection based on the second member's contingencies for receiving notifications.

Contingencies for receiving notifications have been described throughout. They include parameters to meet graduates from Syracuse High from 1975-1985 and are within 5 miles.

Personal attributes could be the same or different from contingencies for receiving notification with the exception of the distance aspect of the contingency for receiving a notification.

Members would also have the ability to list other individual members with information on appropriate distance between mobile devices for starting the notification process. For example, please provide a notification when John Smith is within 1 mile. Unlike some websites, the membership in each list will not be revealed. The model could almost be considered the Lottery of Life. The member doesn't know when, where, or who might be their next encounter when using this invention. The notification process is the first time names will be exchanged.

This service could be marketed to a more mature audience, given the fact the older an individual is, the more groups and organizations they have been a member of. This service will not allow getting reacquainted with a long lost friend to be left to chance alone. This service will not allow an individual who is interested in meeting the right partner to pass within a few feet of this person and miss out on potentially something special.

Revenue Models

A number of ways exist to generate revenue from the present invention:

Members can be charged a fee for signing up with the service.
Monthly membership fees can be charged for using the service.
Members could be charged for each notification they receive.
Members might be charged a fee for responding to notifications and attempting to make a connection with another member.
Advertising space can be sold on the website including click-through income.
Co-marketing relationships could be established and sponsors of meeting locations could be charged for the system directing customers to their establishments.

Premium services may be available to members at a higher rate than regular memberships.

The foregoing has outlined, in general, the complete detailed description of the physical process, and or methods of application of the invention and is to serve as an aid to better understanding the intended application and use of the invention disclosed herein. In reference to such, there is to be a clear understanding the present invention is not limited to the method or detail of construction, fabrication, material, or application of use described and illustrated herein. Any other variation of fabrication, use, or application should be considered apparent as an alternative embodiment of the present invention.

It is understood that the preceding description is given merely by way of illustration and not in limitation of the invention and that various modifications may be made thereto without departing from the spirit of the invention as claimed.

What is claimed is:

1. An internet based mobile device tracking and interactive communication system comprising:
   at least one locatable mobile communications device for a user;
   at least one mobile device tracking system for automatically tracking the at least one locatable mobile communications device in real time;
   a computer stored software comprising executable internet web page based code comprising automated applications related to the at least one mobile device tracking system; an automated contact initiating website with programmed means for inputting a user's desired contact profile and for providing the user with an internet based website service which allows a user to go to a main service website, sign up and join as a registered member, and input the user's mobile communications device tracking information; an automated personalized Web-based application for the user as a registered member to input the user's desired contact profile including a series of parameters related to desired interaction with other users into the personalized web-based application; programmed means for automatically cross checking the user's input parameters against the parameters input by all other internet based website service members and for automatically checking the geographical location of the members using the at least one mobile device tracking system to identify a satisfactory match between the member's input parameters and real time geographical location, and either one or a multitude of other internet based website members' input parameters and real time geographical proximity;
   means for automatically communicating messages to initiate a communication to notify each member identified as having a satisfactory match related to at least one other member's input parameters and real time geographical proximity to serve as a notification to inform them of the satisfactory match so that each notified member can choose to act on the communicated messages by contacting at least one other matching identified member to initiate a personal contact or meeting.

2. The system of claim 1 wherein the at least one mobile device tracking system comprises a Global Positioning System and the user inputs the user's Global Positioning System receiver information.

3. The system of claim 1 wherein the means for communicating messages comprises at least one communicating system taken from the list of communicating systems including a text message, a phone call, and an email.

4. An internet based mobile device tracking and interactive communication method comprising:
   providing a user with at least one mobile device tracking system for tracking locatable mobile communications devices in real time;
   providing automated computer stored software comprising executable internet web page based code comprising applications related to the at least one mobile device tracking system;
   providing an automatic contact initiating website with programmed means for inputting a user's desired contact profile and for providing the user with an internet based website service which allows a user to go to a main service website, sign up and join as a registered member, and input a user's mobile communications device tracking information;
   providing an automated personalized web-based application for the user as a registered member to input the user's desired Contact profile including a series of parameters related to desired interaction with other members into the personalized web-based application;
   automatically cross checking, by a programmed means for cross checking, the user's input parameters against the parameters input by all other internet based website service members and tracking the geographical location of the members using the at least one mobile device tracking system to identify a satisfactory match between the member's input parameters and real time geographic location, and either one or a multitude of other internet based website members' input parameters and real time geographical proximity;
   automatically initiating a communication, by a means for communicating messages, to notify each member identified as having a satisfactory match related to at least one other member's input parameters and real time geographical proximity to serve as a notification to inform them of the satisfactory match so that each notified member can choose to act on the communicated messages by contacting at least one other matching identified member to initiate a personal contact or meeting.

5. The method of claim 4 comprising using a Global Positioning System as the at least one mobile device tracking system and the user inputs the user's Global Positioning System receiver information.

6. The method of claim 4 wherein initiating a communication comprises using at least one communicating system taken from the list of communicating systems including a text message, a phone call, and an email.

* * * * *